M. GARL.
COMBINED EMERGENCY LIGHT AND MANUALLY CONTROLLED SIGNAL.
APPLICATION FILED JULY 17, 1919.

1,334,995.

Patented Mar. 30, 1920.
2 SHEETS—SHEET 1.

Witness
Ed. R. Lusby

Inventor
Marious Garl
By Jerry A Mathews
and Lester L Sargent
Attorneys

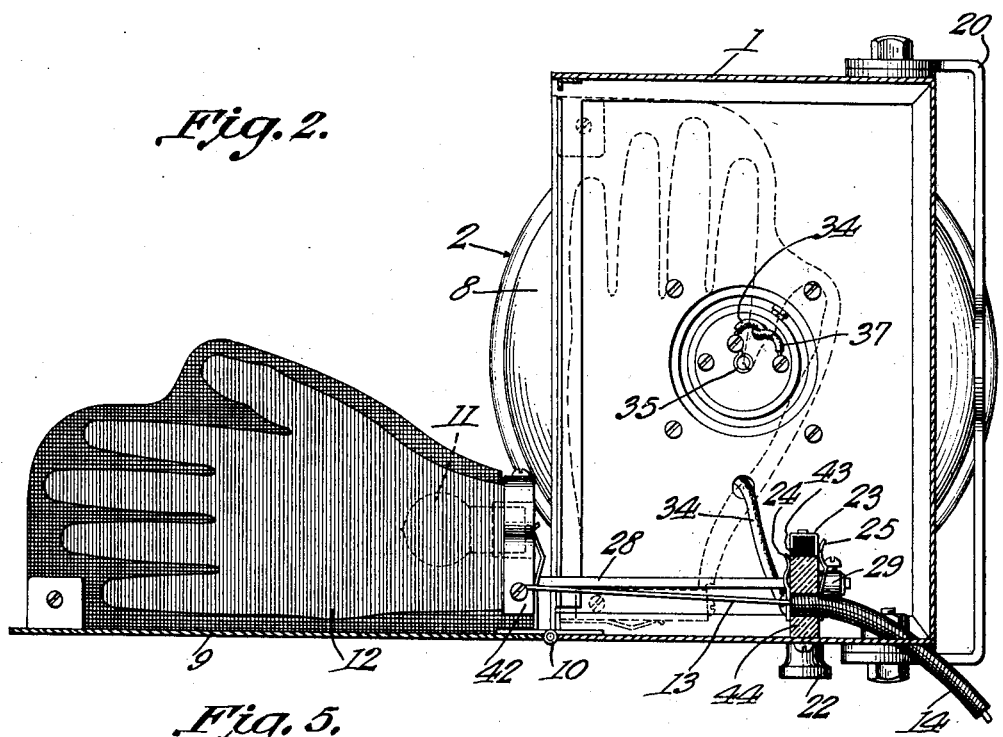
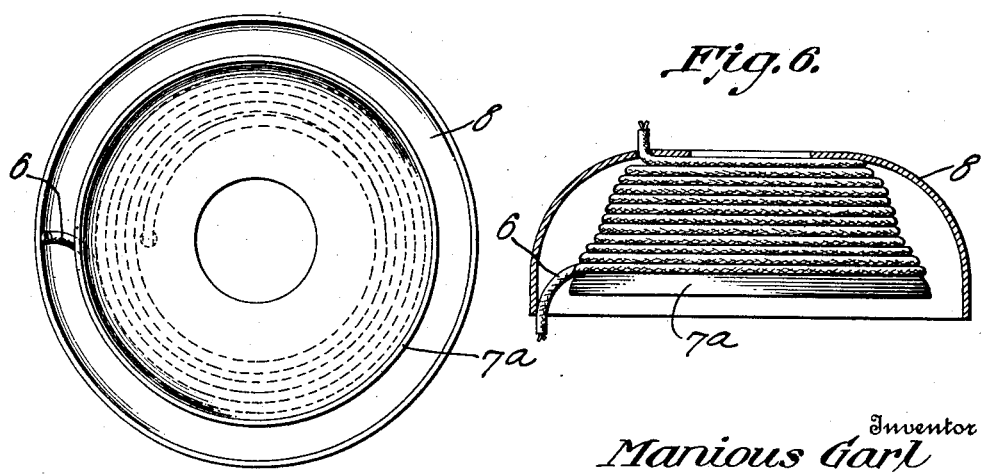

UNITED STATES PATENT OFFICE.

MANIOUS GARL, OF AKRON, OHIO.

COMBINED EMERGENCY-LIGHT AND MANUALLY-CONTROLLED SIGNAL.

1,334,995.  Specification of Letters Patent.  Patented Mar. 30, 1920.

Original application No. 275,604, filed February 7, 1919. Divided and this application filed July 17, 1919. Serial No. 311,658.

*To all whom it may concern:*

Be it known that I, MANIOUS GARL, a citizen of the United States, residing at Akron, in the county of Summit and State of Ohio, have invented a new and useful Combined Emergency-Light and Manually-Controlled Signal, of which the following is a specification.

The object of my invention is to provide a novel emergency or trouble light which may be readily removed from the casing containing an automobile signal light, and carried to a considerable distance; to provide novel means for conveniently retaining the cable or electric wire connected to the light; and to provide novel electrical connections for said light and for switching on and off the the current to the emergency light and the signal light. I attain these and other objects of my invention by the mechanism disclosed in the accompanying drawings, and in my co-pending application, Serial No. 275,604, filed Feb. 7, 1919, of which this is a division.

Fig. 2 is a vertical longitudinal section, with the rear portion of the emergency lamp shown in elevation;

Fig. 5 is a front elevation of my preferred emergency lamp frame; and

Fig. 6 is a cross section through Fig. 5.

Like numerals designate like parts through the several views.

Figure 1:
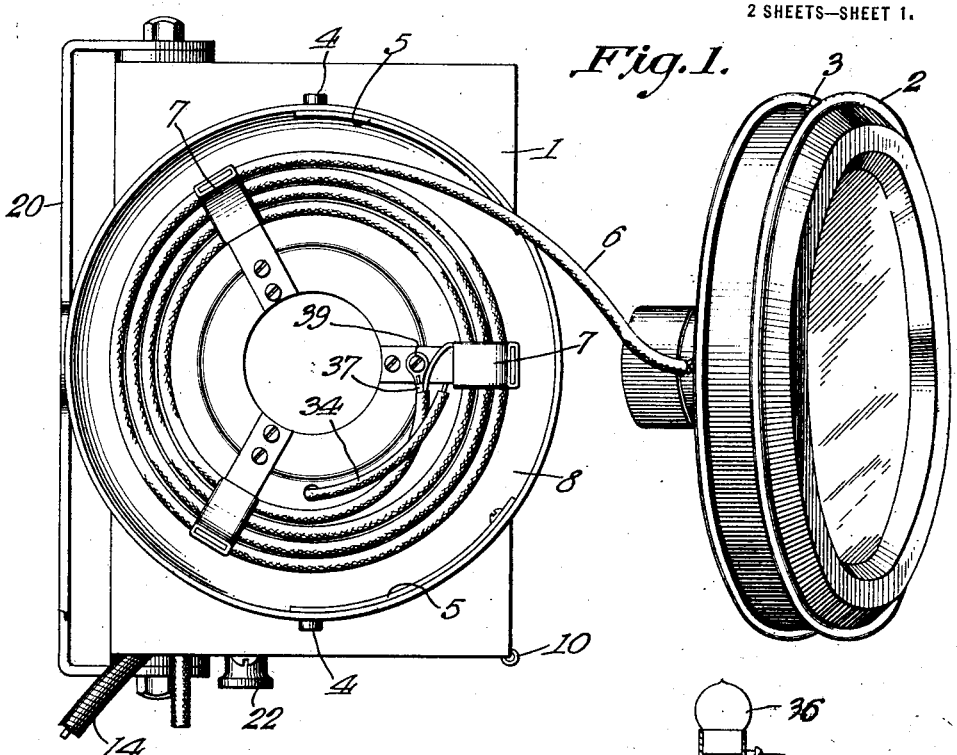
Figure 1 is a front elevation of the emergency light casing, with the emergency light removed and shown in perspective.

Referring to the accompanying drawings, I provide a suitable casing 1 for the signal light, and on which is affixed the emergency or trouble light casing 8. Attached to casing 8 are springs, carrying buttons 4 which are of suitable size to project through openings 3 in the trouble lamp rim to secure that device removably to the casing 8. Emergency light 2 is provided with a suitable insulated set of wires or cables 6 of considerable length, which normally is looped around spring arms 7, as shown in Fig. 1, or around reflector bowl 7$^a$, as shown in Figs. 5 and 6, but which may be readily disconnected to permit of removal of the lamp 2 from casing 8, and the carrying of it to some other part of the automobile where its use is needed to meet the emergency or to locate the trouble.

Referring to Fig. 2, casing 1 is provided with a swingable door 9 hinged at 10 and carrying a suitable transparent signal 12 adapted to be illuminated by electric bulb 11. The shank or wrist 42 of signal 12 is attached to a suitable flexible operating wire 13, operated by a plunger as set forth in my co-pending application. I may provide a suitable attaching bracket 20 attached to casing 1 for attaching the device to an automobile.

Figure 3:
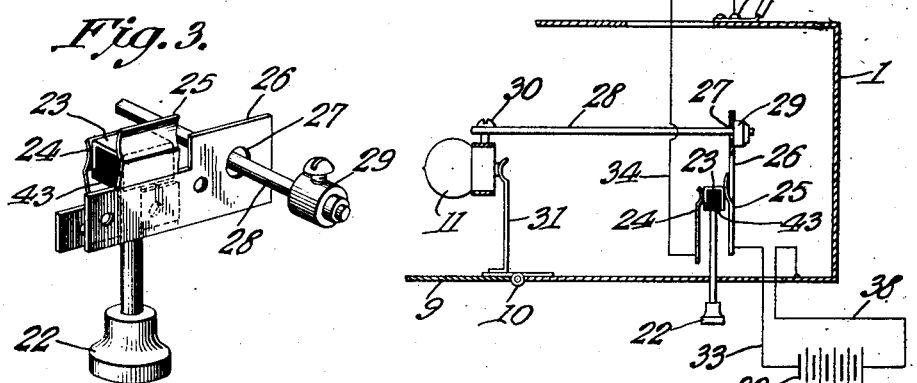
Fig. 3 is a perspective detail view of the switch used for switching on and off both the emergency and signal lights.
Figure 4:
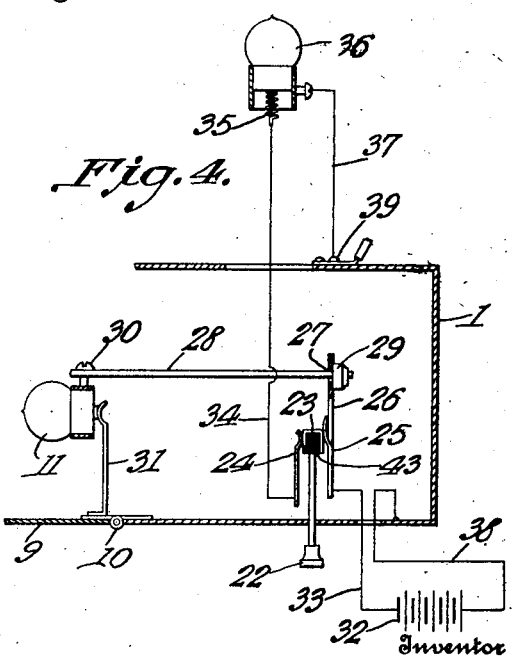
Fig. 4 is a diagrammatic view of the electric circuits in connection with the lamp switches for both lamps.

Referring to Figs. 3 and 4, I provide a suitable switch 22, carrying the insulation block 43, on which is mounted the metal band 23, having a portion thereof in engagement with the contact spring 25 and having the opposite portion arranged to be movable into and out of engagement with the contact spring 24. Attached to contact spring 25 I provide an extension metal plate 26, having an opening 27, through which extends the metal rod 28, carrying at its end the adjustable stop member 29, as shown in the drawings, adapted to be moved into and out of engagement with extension plate 26. The other end of rod 28 is electrically connected to the signal light 11 by member 31. Signal light 11 is grounded to the lamp frame by the spring contact 31. Plate 26 is connected by wire 33 with a suitable battery 32, and the circuit is completed by wire 38, connecting the battery with the casing 1, as shown in Fig. 4.

Referring to Fig. 4, short contact spring 24 is electrically connected to emergency light bulb 36 by wire 34 and contact spring 35, and is connected by wire 37 with casing 1 to which it is grounded at 39. I provide a suitable block 44 of insulation material, to serve as a mounting for contact springs 24 and 25.

When it is desired to remove lamp 2 from casing 8 for use as an emergency or trouble light, the opposed buttons 4 on springs 5 are pressed inwardly, making it possible to remove the lamp and uncoil the electric cable 6 and carry the lamp to the point where its use is desired. Reflector bowl 7$^a$ which is my preferred construction, provides a reflector for the electric bulb 36 and at the same time affords a convenient reel element about which to coil the cable 6, as shown in Figs. 5 and 6.

Referring to Fig. 4, the engagement of member 29 with contact extension plate 26 completes the electric circuit to the signal light 11 when door 9 is swung to its open extended position as will be understood by referring to Fig. 2. Switch 22 provides a convenient means for making or breaking electric circuit to bowl 36 of the emergency lamp 2 for turning that light on and off at will.

What I claim is:

In a device of the class described, the combination of an emergency light, a frame in which said light is removably mounted, an electric cable connected to the light and coiled within the frame, means for retaining the cable in coiled position, means for making and breaking the circuit to said light and to an electric signal light in proximity to said emergency light manually, and the aforesaid signal light, substantially as shown.

MANIOUS GARL.